United States Patent [19]

Schäfer et al.

[11] 4,120,238

[45] Oct. 17, 1978

[54] BALE BINDING APPARATUS WITH RESILIENTLY MOUNTING FILAMENT TWISTING MECHANISM

[75] Inventors: Anton Schäfer, Langenfeld; Karl Probst, Solingen; Kurt Hüfken, Krefeld, all of Germany

[73] Assignee: Lindemann Maschinenfabrik GmbH, Dusseldorf, Germany

[21] Appl. No.: 808,319

[22] Filed: Jun. 20, 1977

[30] Foreign Application Priority Data

Jun. 25, 1976 [DE] Fed. Rep. of Germany ....... 2628540

[51] Int. Cl.² .............................................. B65B 13/28
[52] U.S. Cl. .................... 100/11; 100/19 R; 100/31
[58] Field of Search ................ 100/11, 17, 19 R, 24, 100/31, 29; 140/93.6, 118

[56] References Cited

U.S. PATENT DOCUMENTS

| 2,585,425 | 2/1952 | Baskerville | 100/31 X |
| 3,431,837 | 3/1969 | May | 100/31 |

FOREIGN PATENT DOCUMENTS 1,379,770  1/1975  United Kingdom ...................... 100/17

*Primary Examiner*—Billy J. Wilhite
*Attorney, Agent, or Firm*—Toren, McGeady and Stanger

[57] ABSTRACT

Apparatus for binding bales by winding a filament, such as a wire or similar device thereabout, is provided with a twisting head which operates to twist together the ends of a binding filament after the filament has been wound around a bale. As the twisting operation is performed, tensile forces developed in the twisted filament may cause rupture of the filament. To avoid such rupture, the twisting head is resiliently mounted to enable absorption of the filament tensile forces thereby to avoid undesired rupture of the filament.

11 Claims, 5 Drawing Figures

BALE BINDING APPARATUS WITH RESILIENTLY MOUNTING FILAMENT TWISTING MECHANISM

BACKGROUND OF THE INVENTION

The present invention relates generally to apparatus for binding bales with a filament, such as baling wire, and more particularly, to apparatus wherein the binding filament is automatically wound around the bale and then twisted to secure the filament to the bale. The apparatus of the invention is of the type wherein the bales to be bound are formed in a press chamber by means of a press die with at least one loop of baling wire arranged to extend within a winding plane being applied to each bale. The apparatus includes a twisting head which twists the ends of the binding filament together in order to secure the filament around each bale with the twisting head being mounted for pivotal movement into and out of twisting position.

Inasmuch as the wire or filament which is used in devices such as the present invention must be twisted at its ends in order to secure the wire to the bale to be bound, the forces which develop within such binding filaments tend to cause rupture of the filament during the twisting operation. In the prior art, devices of this type have been known wherein attempts have been made to avoid disadvantages caused by overstressing of the binding filament caused by the twisting of the filament which may result in frequent breaks in the filament. Such a device is, for example, disclosed in German DOS No. 2,419,151. Although this device operates satisfactorily, occasional wire breaks cannot be avoided. In the operation of this device, a twist zone is formed during the twisting of a pair of wires by a twist wheel. The two wires to be twisted together extend above and below the twist wheel over a given distance. The twist wheel includes a radially extending slot within which the wires to be twisted together are inserted with rotation of the wheel causing the wires to twist. The slot in the twist wheel generally is formed with a width which is less than the thickness of the twist zones. Since the width of the slot corresponds substantially to the thickness of a wire, displacement of the wire in the axial direction cannot be accommodated immediately after the start of twisting. On the other hand, since the length of wire to be twisted is shortened during the twisting operation, tensile forces and thus wire breaks cannot be avoided unless compensation is provided for the shortening of the wire.

Generally, the baling wire to be used is delivered from supply rolls. Since the supply rolls freely dispense wire, when the twisting operation is performed, the side of the twist facing or closest to the supply rolls generally causes no problem inasmuch as any tensile forces which are developed will be alleviated merely by further dispensing of wire.

However, since the wire must be wrapped around a bale, one side of the twist, or the side thereof opposite the side facing the supply rolls, will have no ability to compensate for tensile forces since that side of the twist will be firmly engaged around the bale. Thus, where the loop of wire extending around the bale is produced only with enough wire to provide a loop circumference to accommodate the girth of the bale, no compensation for shortening of the wire due to the twisting operation is possible. Compensation for the aforementioned forces caused by shortening of the wire is only possible if the bale to be bound is loosely engaged by the encircling wire. Of course, such a loose binding of the bale is undesirable.

Depending upon the material from which the bale is made, and depending particularly upon the elasticity or resilience of the material, greater or lesser tensile forces will be developed in the baling wire causing breaks therein. Particularly with bales made of very hard material, breaks will occur very close to the twist zone between the twist zone and the twist wheel forming the twist.

When a break occurs, the bale of material may be inadequately bound and as a result such bales involving broken binding filaments must be taken out of production thereby leading to interruptions in the continuity of the baling operation.

In addition to this, an inflexible twist zone in a binding filament will produce an adverse effect inasmuch as the resulting high tensile stresses generated will influence both the bearing of the twist wheel and the suspension of the twisting head causing premature wear of these parts.

The present invention is directed toward the problem of developing a device for overcoming the aforementioned difficulties. The invention is directed toward providing means for reducing or eliminating the potential for breakage of a binding filament in apparatus for winding bales with wire. Furthermore, the invention, by reducing the adverse forces generated during the baling process, operates to extend the life of the apparatus and particularly the life of the twisting head or wheel.

SUMMARY OF THE INVENTION

Briefly, the present invention may be described as apparatus for binding bales of material with wire or binding filaments, the apparatus including press means within which the bales are formed and by which the bales are moved through the apparatus in a given direction, supply means for providing binding filament for wrapping the bales, the supply means being arranged so that the filament extends transversely across the front side of the bales forwardly thereof taken relative to the given direction of travel of the bale through the apparatus, and reciprocating means movable transversely of the given direction of travel of the bales, the reciprocating means being adapted to reach behind the bales for gripping the filament in order to wind the filament about the rear side of the bales in order to bring portions of the filament into general adjacent relationship, with the length of the filament between the adjacent portions extending around the bale. Twisting means including a twisting disc are provided to engage the adjacent portions and to twist the adjacent portions together. The twisting means include cutting means for cutting the filament through said twisted portions at a point intermediate the twist so that portions of the filament on both sides of the cut remain twisted together. The twisting means is mounted by resilient mounting means which operate to enable the twisting means to absorb the tensile forces which are developed in the filament during twisting of the adjacent portions of the filament.

Thus, by virtue of the resilient mounting means of the invention, the twisting means performs a yielding movement during the twisting operation which corresponds to the shortening within the twist zone of the binding filament caused by twisting of the filament. The binding filament is thus not exposed to undue loads and undesired forces tending to sever the binding filament are reduced or eliminated.

The binding filament is dispensed from two supply sources with the supply sources being located so that a continuous winding filament may be located to extend across the front of the bale as the bale is being transported through the apparatus. Thus, as the bale moves forwardly the binding filament is wrapped around the front of the bale and subsequently the reciprocating means are moved behind the bale to grasp the filament and bring it about the rear side of the bale, with portions of the filament being brought adjacent each other to enable the twisting operation to be effected. It will be appreciated that during the twisting operation, the twisted portions of the filament will have filament extending from the supply sources on one side thereof. The other side of the twist will have the bale located thereat. Inasmuch as the supply means freely dispense filament, no tension develops between the twist and the supply means during the twisting operation. However, inasmuch as the filament must be tightly wound about the bale, the filament does not yield when tensile forces are developed thus causing rupture.

Since the forces which are developed tending to rupture the filament occur on the side of the twist toward the bale, the twisting head is arranged so that its resilient movement may occur in the direction of the bale in order to absorb the tensile forces.

Thus, in order to maintain the twisted filament taut during the twisting operation the twisting head is arranged to be moved in the direction of the bale, and consequently in the direction of the press means, against the force of a resilient restoring element, such as a spring. If the restoring element is adjustable with regard to the resilient force which is applied to the twisting head, care may be taken that the movement of the twisting head commences only when a certain predetermined tensile stress is developed in the wire, or when such tensile stress is exceeded. Thus, in the preferred embodiment of the invention, the resilient mounting means for the twisting head is made adjustable with regard to the resilient force applied to the twisting means.

In order to avoid any bending stress on the twist zones, the twisting head is mounted by a parallel guide which insures that the twisting head moves while being maintained in its operating position and while maintaining its appropriate angular position which is generally selected to be horizontal.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENT

Figure 1:
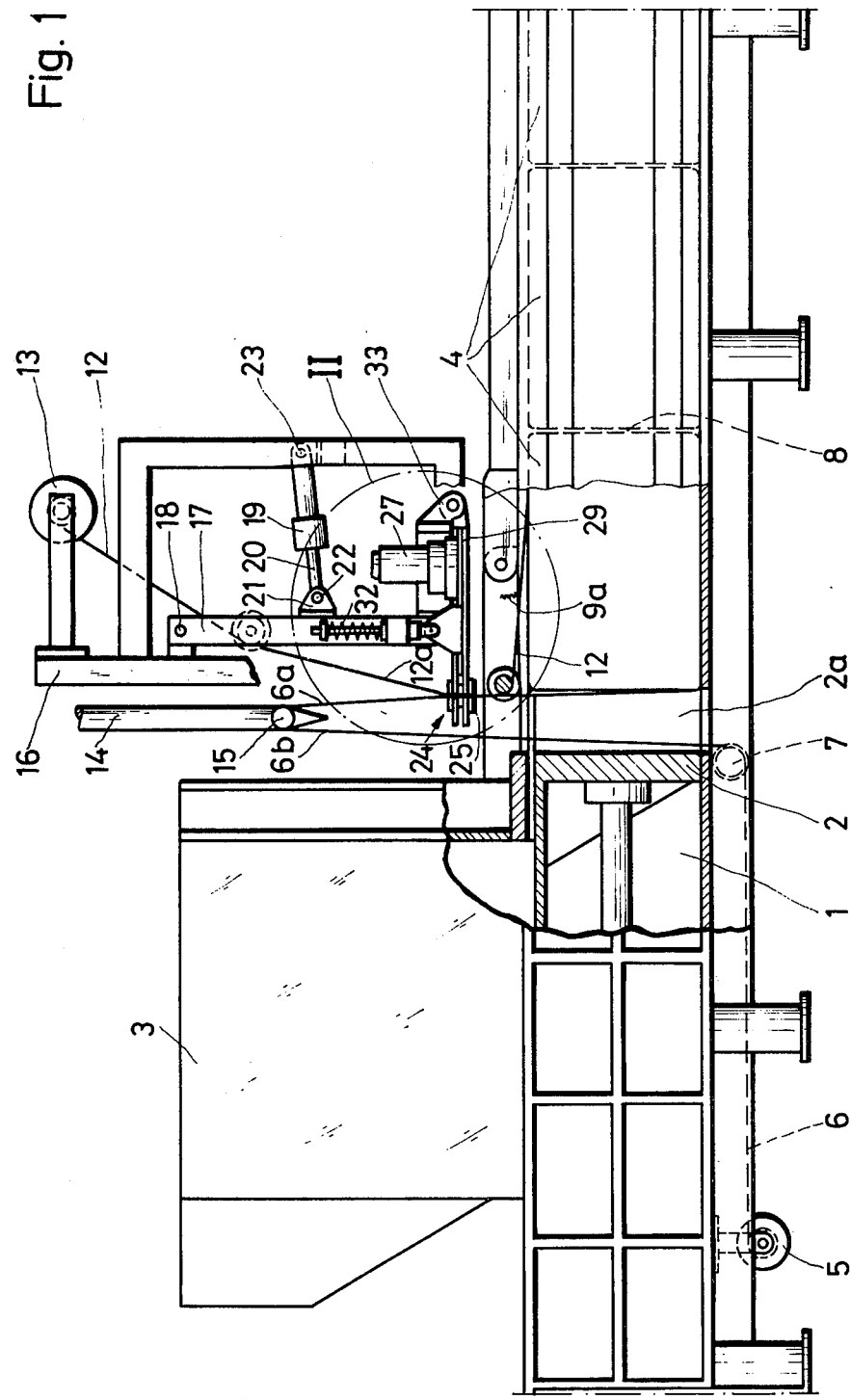
FIG. 1 is a view in side elevation partially broken away and partially in section showing a baling apparatus in accordance with the present invention.

Referring now to the drawings, wherein like reference numerals refer to similar parts throughout the various figures thereof, the present invention is depicted as including press means for forming bales of material which are to be bound by filaments such as wire. The press means include a press duct 1 having a rectangular cross section generally conforming to the shape of the bales to be formed and through which the bales are passed during the binding operation. Within the press duct 1 there is displaceably mounted a press die 2 which is moved reciprocally through the press duct by drive means (not shown). As indicated in FIG. 1, the die 2 moves leftwardly and righwardly in the formation of a bale. The material from which individual bales are formed is introduced through a hopper 3 which opens into the duct 1 from the top thereof. Usually, several working strokes are required for the production of each bale. With the press die 2 in its retracted or leftmost position, material is introduced into the hopper 3 and is allowed to accumulate in the duct 1 whereupon the press die 2 operates to form a bale through the several working strokes.

In the condition shown in FIG. 1, the press duct 3 has contained therein three pressed bales 4 which may be, for example, formed from materials such as waste paper. The rightmost bale 4 and the next adjacent or middle bale 4 are shown already bound with binding filament or wire. The leftmost bale 4 is in a position where binding is about to occur.

Figure 3:
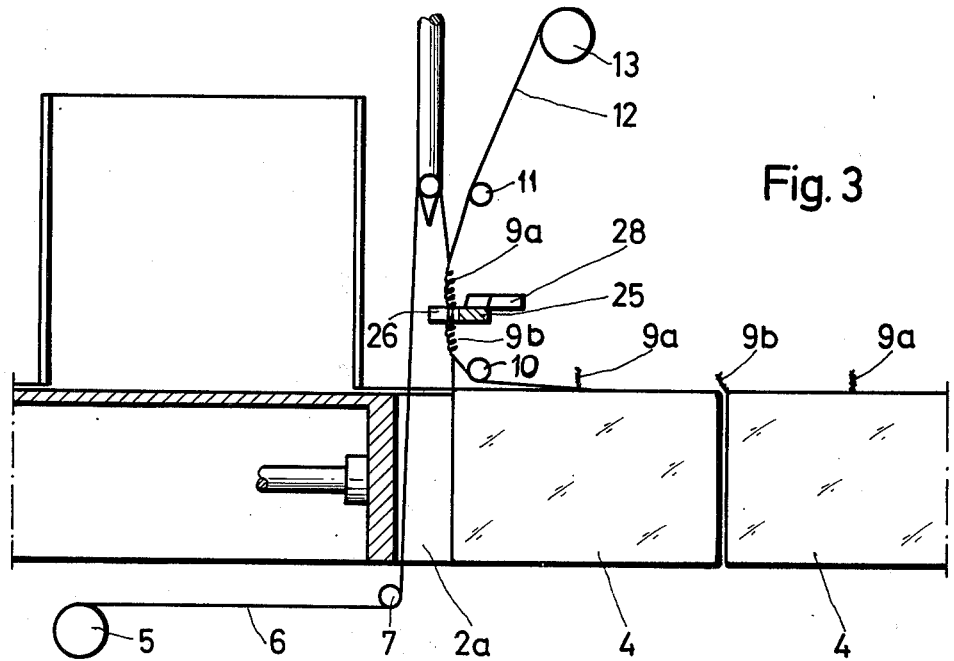
FIGS. 3, 4 and 5 are schematic side views showing the apparatus of the invention during different stages of its operation.
Figure 4:
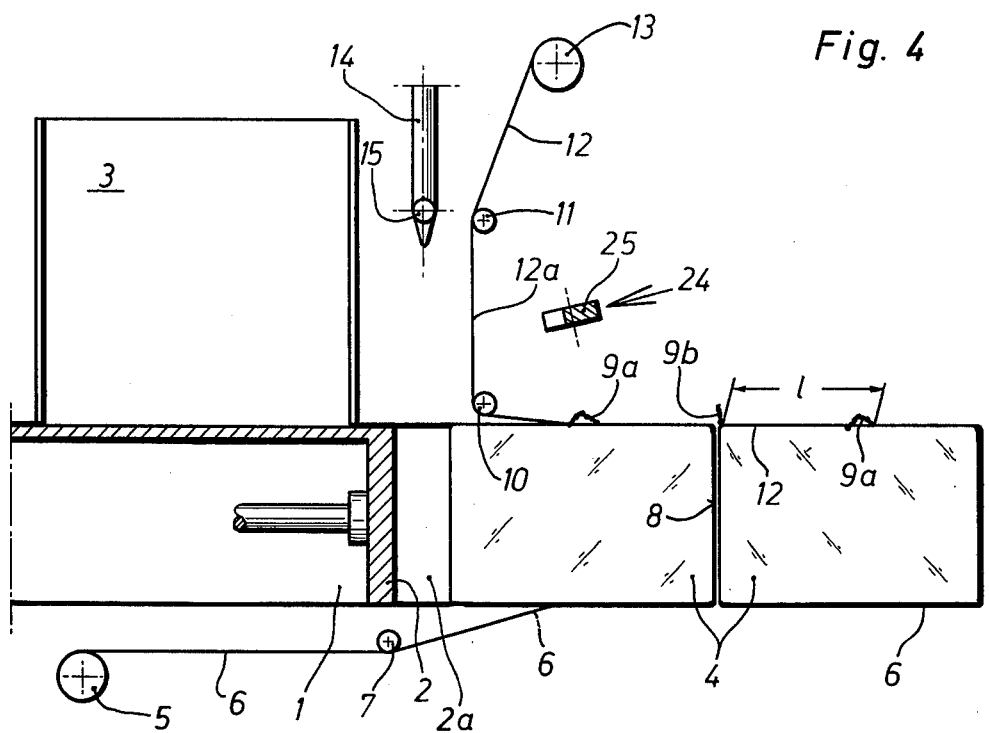
Figure 5:
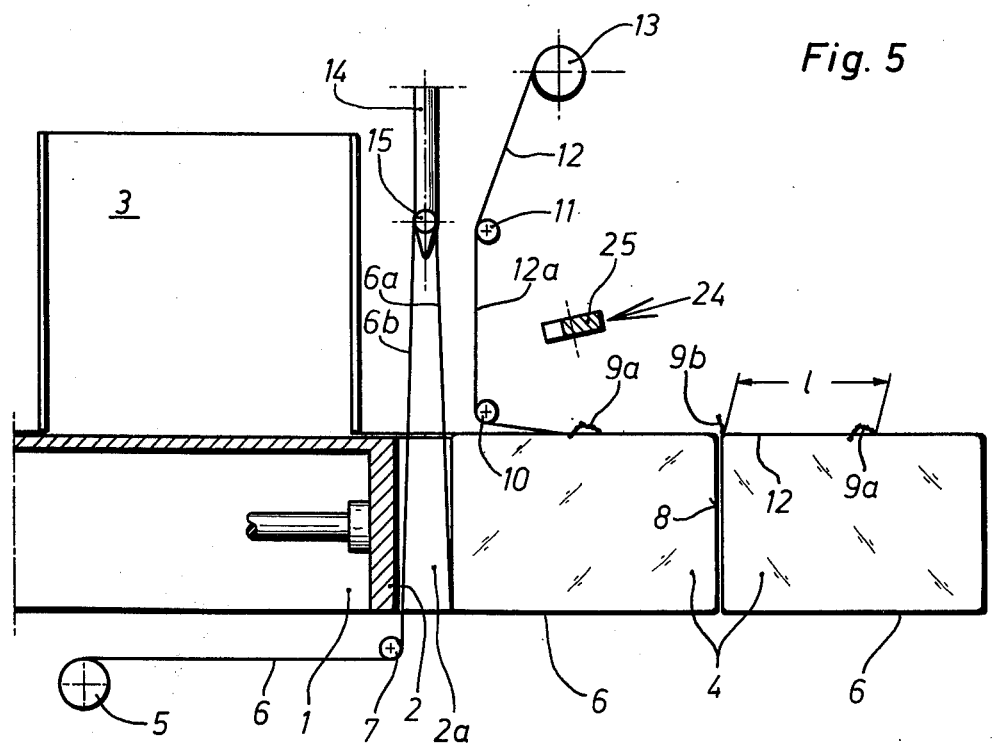

The operation of winding a binding filament about the bales is best depicted in FIGS. 3, 4 and 5. Referring first to FIG. 4 the wire or filament which is to be used to bind the bales is supplied from two sources, a bottom delivery roll 5 and a top delivery roll 13. As seen in FIG. 4, a first wire 6 extends from the bottom delivery roll 5 about a guide roller 7 and about the front face 8 of a bale 4 and extends to a twist zone 9a which has previously been formed during a prior twisting operation, as will be more clearly described hereinafter. The top delivery roll 13 supplies a second wire 12 which runs downwardly past guide rollers 11 and 10 with the lower end of the second wire 12 being engaged with the end of the first wire 6 at the twist zone 9a.

Thus, as a bale 4 moves rightwardly through the duct 1, the front face 8 of the bale will encounter the joined wires 6 and 12 and the wires will be drawn about the front face 8 and over the upper side and about the bottom side of the bale.

With the apparatus in the position shown in FIG. 4, a lacing needle 14 including a catch hook 15 is moved downwardly through a groove or slot 2a longitudinally extending through the press die 2 in order to engage the first wire 6 to pull or draw the first wire 6 upwardly about the rear side of the bale, as in FIG. 5. Thus, the lacing needle 14 basically comprises a reciprocating member which moves downwardly through the slot 2a to engage the wire 6, with the wire 6 being grasped by the catch hook 15 so that when the needle 14, during its reciprocating movement, moves upwardly, the wire 6 is drawn to extend about the rear of the bale 4.

With the apparatus in the position shown in FIG. 5, a loop 6a, 6b is formed to extend about the catch hook 15.

It will be seen that the portion of the loop 6a will lie generally adjacent a portion 12a of the second wire 12 which extends between the rollers 10 and 11. These adjacent portions 6a, 12a are formed into a twisted configuration to form twist zones 9a, 9b, as shown in FIG. 3. After the arrival of the apparatus at the condition shown in FIG. 5, a twisting head 24 including a twist wheel 25 is brought into a position best seen in FIG. 1 and by operation of the twist means including the twist head 24 and the twist wheel 25, the twist zones 9a, 9b shown in FIG. 3 are formed. Subsequently, a cutting device 28 is brought into operation and the twist zones 9a, 9b are separated and the finished bale 4 is moved rightwardly through the duct 1. Subsequently, the reciprocating needle 14 is lowered once again and the binding filament or wire will be arranged with the first wire 6 and the second wire 12 interconnected by the twist zone 9a. A subsequent bale 4 may then be moved rightwardly through the duct 1 and the apparatus will be returned to the condition depicted in FIG. 4 for repetition of subsequent operations of the type hereinbefore previously described.

The apparatus of the invention includes a gate 16 secured on the press duct 1 with a frame 17 being mounted on the gate 16. The frame 17 is pivotally connected at one end thereof to a pivot axis 18 and a cylinder-piston drive 19 is operatively interposed between the frame 17 and a movable mounting 23 connected to the gate 16. The drive member 19 includes a piston rod 20 which is connected by means of a fork head 21 and a bolt 22 to the frame 17. The frame 17 is essentially arranged in the manner of a pivoted arm which may rotate about the axis 18 and the twisting means including the twisting head 24 is carried on the frame 17. As a result of the pivotal motion of the frame or arm 17 about the axis 18, the twisting means including the head 25 may be swung or pivoted from a first position out of operative engagement with the portions 6a, 12a of the binding filament, as depicted in FIGS. 4 and 5, into an operative position best seen in FIGS. 1 and 3 where the twisting head 25 engages the portions 6a, 12a to form a twist therein, as shown in FIG. 3.

The twisting means includes the twist wheel 25 which has formed therein a generally radially extending slot 26 within which the wire portions 6a, 12a may become engaged during the twisting operation. The twist wheel is driven by a motor 27 through an intermediate drive 30. The twisting wheel 25 forms the wire portions 6a, 12a into a pair of twist zones 9a, 9b and after the twist zones are formed the cutting device 28 moves above the twist wheel 25 and severs the twist zones 9a, 9b from each other.

It should be mentioned at this point that the apparatus depicted in the drawings may contain a plurality of individual binding units to wind a plurality of binding filaments about a single bale. The description thus far has included means for winding only one loop of binding filament about a bale. However, it should be understood that a series of similar devices may be arranged side by side along the length of a bale extending in a direction perpendicularly to the drawing and a plurality of rollers 5 and 13 may operate to supply a plurality of first wires 6 and second wires 12 which may be individually formed in a plurality of loops about a bale 4. Thus, although the invention is described by way of example only with reference to a single twisting head 24, it will be understood that several such heads are actually provided and that the process of the loop formation described thus far may be performed simultaneously by a plurality of similar elements along the length of the bale 4.

During the twisting of the wire portions 6a, 12a, the binding filament extending about the bale 4 is shortened as a result of the formation of the twist zones. The amount of shortening which occurs may be within the range from 10 to 20 mm, depending upon the thickness of the wire or filament which is used. For twist zone 9a, this may be easily compensated by drawing additional wire from the rolls 5 and 13. However, on the opposite side of the twisting wheel 25, it is not possible to provide additional length of wire to alleviate the tensile stresses which occur as a result of the twisting and shortening of the wire since the length of wire or filament lying on the side of the twist wheel where the twist zone 9b is located must be firmly engaged about the bale 4. Thus, if the wire looped about the bale 4 is to be maintained taut, it cannot alleviate the stresses created by the twisting operation. Furthermore, it is not possible to alleviate these stresses by pulling the twist zones downwardly through the slot 26 as the twist is being formed. This is due to the fact that the slot 26 in the twist wheel 25 is formed with a width which is only equivalent to the thickness of the wires which are twisted therein. Accordingly, as the twist is formed, the twist zones 9a, 9b created on either side of the twist wheel 25 are generally twice as thick as the slot is wide and thus the twist zone 9a cannot be pulled down through the slot. In any case, operation in this manner would be undesirable in any event since a reliable twisting operation would no longer be ensured.

The present invention overcomes the problems created by shortening of the binding filament caused by the twisting operation by resiliently mounting the twisting head 25 upon the mounting arm or frame 17 so that the twisting head 25 may move downwardly in the direction of the press duct 1 and toward the bale 4 while the twisting operation is taking place in order thereby to alleviate the tensile forces which are created and to avoid rupture of the binding filament.

Figure 2:
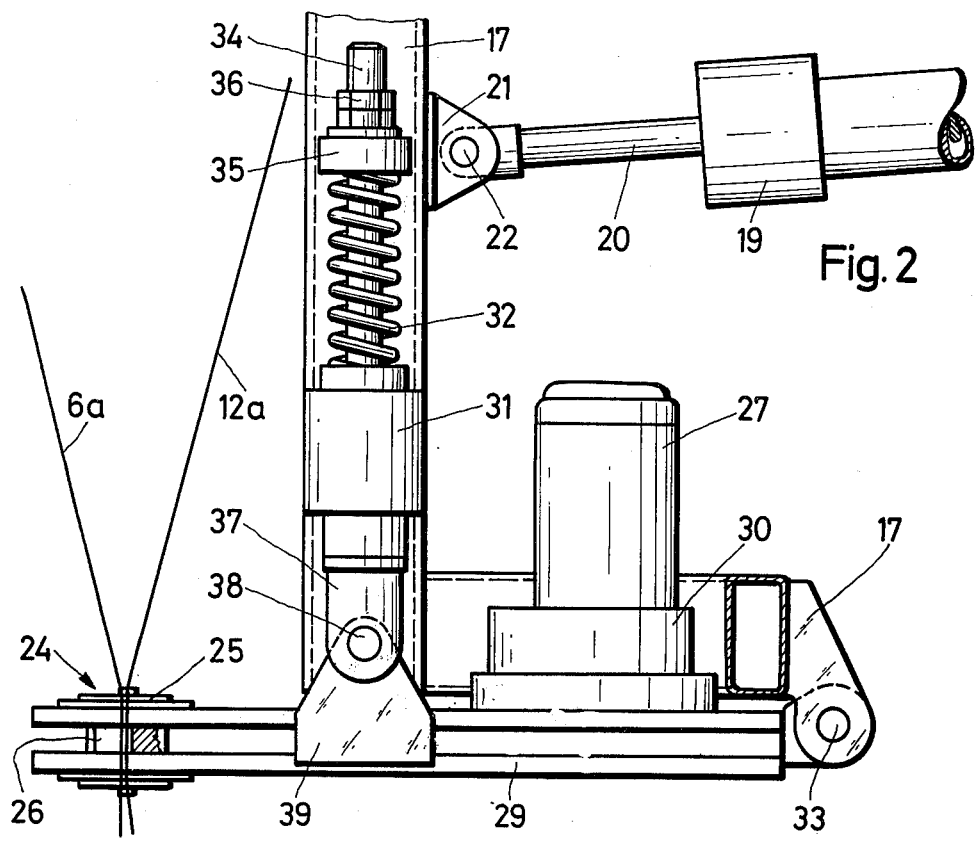
FIG. 2 is a side elevation showing in greater detail and on a more enlarged scale portions of the apparatus shown in FIG. 1, these portions lying within the area identified with II.

As best seen in FIGS. 1 and 2, the apparatus includes a frame part 29 which is pivotally mounted at one end upon one or several joints 33 while the twisting head 24 and the twisting wheel 25 are carried on the opposite side of the frame part 29. Intermediate the ends of the frame part 29 there is provided a lug 39 by which the frame 29 is attached to a fork head 37 by a bolt 38 extending between the lug 39 and the fork head 37. The fork head 37 is connected to a pull rod 34 which has attached thereto by means of nuts 36 a disc 35. Within the frame part 17 there is fixedly mounted a holder 31 against which a compression spring 32 bears. The spring 32 is held in compression between the holder 31 and the disc 35. As a result, the fork head 37 connected to the lug 39 may move downwardly to compress the spring 32. Thus, the frame part 29, and consequently the twisting head 24 attached thereto, may be resiliently moved downwardly, as viewed in FIG. 2. Thus, as the twisting operation occurs, and as the binding filament shortens to cause tensile stress to be generated within the portions of the filament extending about a bale 4, the twist head 24 will move downwardly to alleviate these forces by operation of the resiliency of the spring 32. Thus, as the twist wheel 25 rotates and as the binding filament shortens, the spring 32 will be pulled in tension thereby permiting resilient movement of the twist head 24 to alleviate the tensile forces in the filament and reduce the tendency of the filament to rupture.

As will be apparent from FIG. 2, the spring force of the compression spring 32 may be adjusted, if necessary by adjustment of the nuts 32. Thus, a greater or lesser spring force may be applied upon the frame part 29 as it rotates about the joints 33 during the twisting operation. The spring force is selected depending upon the nature of the binding filaments 6 and 12 and depending upon the tensile stress which is created by the twisting operation. The spring should begin to permit movement of the twist head 24 after a certain tensile stress has been exceeded so that a predetermined amount of tensile in the binding filament may be avoided and breaks may thus be prevented.

Additionally, it will be noted that since the frame or arm 17 is of a generally linear configuration, the movement of the twist head 24 will be guided in accordance with the overall configuration of the resilient mounting means described.

Of course, it will be apparent that other fastening means may be utilized to connect the frame part 29 onto the frame or arms 17 without deviating from the scope of the invention. The frame part 29 need not necessarily be connected over one or more joints 33 with frame 17 and it may also extend with its axis parallel to compression spring 32 in correspondingly arranged guides (not shown) in or on frame 17 so that a parallel movement of frame 29 is obtained. That is, frame part 29 need not change its angular position in the case where the preset spring forces exceeded so that bending stresses in the twist zones are positively avoided.

While a specific embodiment of the invention has been shown and described in detail to illustrate the application of the inventive principles, it will be understood that the invention may be embodied otherwise without departing from such principles.

What is claimed is:

1. In apparatus for applying binding filaments about bales of material, said apparatus including press means for producing said bales, and binding means operating to apply about each bale at least one loop of a binding filament arranged to extend within a winding plane, said binding means including a twisting head for twisting together ends of said binding filament, said twisting head being moveably mounted upon said apparatus to be swung in and out of twisting position, the improvement comprising means resiliently mounting said twisting head when said head is in said twisting position, said resilient mounting means being arranged to enable movement of said twisting head in a direction generally toward said bale during the time that said twisting head is performing a twisting operation.

2. Apparatus according to claim 1 wherein said means for resiliently mounting said twisting head is equipped to enable resilient movement of said twisting head to absorb forces acting against said twisting head developed as a result of the twisting of said filament.

3. Apparatus according to claim 1 wherein said means resiliently mounting said twisting head includes a restoring element, said twisting head being movable against the force of said restoring element in the direction of said press chamber, said restoring element operating to return said twisting head to its original position after said twisting operation.

4. Apparatus according to claim 3 wherein said restoring element comprises a compression spring biasing said twisting head toward its initial position to return said twisting head to said initial position at the termination of said twisting operation.

5. Apparatus according to claim 1 wherein said resilient mounting means includes means for guiding movement of said twisting head in response to forces acting thereagainst during said twisting operation.

6. Apparatus according to claim 1 wherein said resilient mounting means includes a compression spring.

7. Apparatus according to claim 1 wherein said resilient mounting means operate to apply a resilient force counteracting forces applied against said twisting head as a result of said twisting operation, said resilient mounting means including means for adjusting the degree of counteracting force applied by said resilient mounting means to said twisting head, said adjusting means enabling said resilient mounting means to be set so that movement of said twisting head commences when a predetermined degree of force is applied thereto as a result of said twisting operation.

8. Apparatus for applying binding filaments about bales of material comprising means for forming bales to be bound and for moving said bales in a given direction, supply means for providing filament for binding said bales, said supply means being arranged to direct said filament to extend transversely across the front side of said bales forwardly thereof taken relative to said given direction, reciprocating means moveable transversely of said given direction behind said bales for gripping and winding said filament about the rear side of said bales in order to bring portions of said filament into general adjacent relationship with the length of said filament between said adjacent portions extending around said bale, twisting means for twisting said adjacent portions together, cutting means for cutting said twisted adjacent portions at a point intermediate said twist so that portions of said filament on both sides of said cut remain twisted together, and means for resiliently mounting said twisting means to absorb tensile forces developed in said filament during twisting of said adjacent portions thereof, said resilient mounting means being arranged to enable said twisting means to move in a direction generally toward said bale while said twisting means is performing a twisting operation.

9. Apparatus according to claim 8 wherein said apparatus includes a mounting frame and wherein said resilient mounting means include an arm having a first end pivotally mounted to said mounting frame and a second end including a spring for resiliently mounting said twisting means thereto.

10. Apparatus according to claim 9 wherein said twisting means is pivotally movable between a first position where it may engage said adjacent filament portions to perform said twisting operation and a second position away from said first position by pivotal movement of said arm about said first end.

11. Apparatus according to claim 8 wherein said twisting means include a generally circular disc having a radially extending slot therein adapted to receive said adjacent portions of said filament, said disc being mounted to rotate with said adjacent filament portions in said slot thereby to effect said twisting operation.

* * * * *